US011991252B2

(12) United States Patent
Wen et al.

(10) Patent No.: US 11,991,252 B2
(45) Date of Patent: May 21, 2024

(54) METHODS, DEVICES, SYSTEMS, AND NON-TRANSITORY MACHINE-READABLE STORAGE MEDIUMS FOR CONFIGURING PARAMETER SAMPLING OF DEVICES

(71) Applicant: Siemens Aktiengesellschaft, Munich (DE)

(72) Inventors: Bo Wen, Beijing (CN); Shun Jie Fan, Beijing (CN); Peng Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/612,691

(22) PCT Filed: May 21, 2019

(86) PCT No.: PCT/CN2019/087844
§ 371 (c)(1),
(2) Date: Nov. 19, 2021

(87) PCT Pub. No.: WO2020/232639
PCT Pub. Date: Nov. 26, 2020

(65) Prior Publication Data
US 2022/0224771 A1    Jul. 14, 2022

(51) Int. Cl.
*H04L 67/00* (2022.01)
*G06F 18/214* (2023.01)
*H04L 67/1097* (2022.01)

(52) U.S. Cl.
CPC ............ *H04L 67/34* (2013.01); *G06F 18/214* (2023.01); *H04L 67/1097* (2013.01)

(58) Field of Classification Search
CPC .................................................. H04L 67/1097
See application file for complete search history.

(56) References Cited

U.S. PATENT DOCUMENTS

| 10,404,833 B1* | 9/2019 | de Sales, Jr. ........... H04L 67/34 |
| 2013/0211559 A1 | 8/2013 | Lawson et al. |

(Continued)

FOREIGN PATENT DOCUMENTS

| CN | 108536469 A | 9/2018 |
| CN | 108566299 A | 9/2018 |

(Continued)

OTHER PUBLICATIONS

International Search Report and Written Opinion dated Feb. 19, 2020.

*Primary Examiner* — Viet D Vu
(74) *Attorney, Agent, or Firm* — Harness, Dickey & Pierce, P.L.C.

(57) ABSTRACT

The present disclosure relates to a method, device, and system for configuring parameters, a computer device, a medium, and a product. A configuration device for configuring parameter sampling with respect to an edge device includes: one information acquiring unit, configured to acquire information related to the purpose and use environment of the edge device; one transmitting unit, configured to transmit the information to a cloud platform; and one configuration information determining unit, configured to receive configuration information for parameter sampling with respect to the edge device from the cloud platform, where the configuration information is configuration information determined as matching the information by the cloud platform utilizing a configuration model stored thereby.

22 Claims, 7 Drawing Sheets

(56) References Cited

U.S. PATENT DOCUMENTS

| | | | | |
|---|---|---|---|---|
| 2014/0207827 A1* | 7/2014 | Huang | .................... | G06F 16/21 |
| | | | | 707/803 |
| 2015/0287318 A1* | 10/2015 | Nair | ...................... | G06Q 10/10 |
| | | | | 340/5.6 |
| 2015/0312275 A1* | 10/2015 | Grosskopf | .............. | H04L 67/10 |
| | | | | 726/1 |
| 2017/0147928 A1* | 5/2017 | Vijayendra | ......... | G06F 9/44505 |
| 2017/0289824 A1* | 10/2017 | Figoli | ................... | H04W 24/02 |
| 2019/0050414 A1 | 2/2019 | Maturana et al. | | |
| 2019/0116091 A1 | 4/2019 | Bijavara Aswathanarayana Rao et al. | | |
| 2019/0149361 A1* | 5/2019 | Sarwar | ................ | H04L 41/0806 |
| | | | | 370/254 |
| 2019/0349263 A1* | 11/2019 | Ghosh | ................... | H04L 41/145 |
| 2020/0106632 A1* | 4/2020 | Lewis | ...................... | H04L 67/51 |
| 2021/0152636 A1* | 5/2021 | Ruflin | .................... | G06F 9/543 |

FOREIGN PATENT DOCUMENTS

| | | | |
|---|---|---|---|
| CN | 109067618 A | 12/2018 | |
| CN | 109561410 A | 4/2019 | |
| CN | 109714429 A | 5/2019 | |
| EP | 2660667 A2 | 11/2013 | |
| EP | 3444689 A1 | 2/2019 | |

\* cited by examiner

ND NON-TRANSITORY MACHINE-READABLE STORAGE MEDIUMS FOR CONFIGURING PARAMETER SAMPLING OF DEVICES

METHODS, DEVICES, SYSTEMS, AND NON-TRANSITORY MACHINE-READABLE STORAGE MEDIUMS FOR CONFIGURING PARAMETER SAMPLING OF DEVICES

PRIORITY STATEMENT

This application is the national phase under 35 U.S.C. § 371 of PCT International Application No. PCT/CN2019/087844 which has an International filing date of May 21, 2019, which designated the United States of America 2020, the entire contents of each of which are hereby incorporated herein by reference.

FIELD

The present application relates generally to the field of automation, in particular to a method, apparatus and system for configuring parameter sampling of a device, and to a computing device, a medium and a product.

BACKGROUND

Digitization is an important part of Industry 4.0, and data is the basis for digitization. With the popularization of the industrial cloud, more and more users are beginning to upload the data of their drivers, machinery, product lines and factories, etc. to the cloud. These data are used to describe the features of the corresponding equipment, and the precision of description is determined by the data sampling time. For the same piece of equipment, although high-frequency data can describe the characteristics thereof more accurately, this will generate a large amount of data, which requires a large amount of network resources, such as bandwidth and data storage.

In the case of edge devices (or IoT gateways), users will find it difficult to choose which parameters are of vital importance in data analysis applications, and will find it difficult to decide on the optimal sampling rate.

Up until now, the most common data collection configuration solution has been the default mode. This mode is generally bound to local data acquisition software, and will provide the user with basic suggestions regarding which parameter data to collect according to the default sampling time.

SUMMARY

The inventors have discovered that such a method has the following problems:

First of all, the inventors have discovered that the selection of a suitable sampling time according to each scenario is by no means a simple task, especially if experience is lacking. For this reason, a user might feel confused when faced with setting the sampling time. Although the default setting might be bound to data collection software, a universal setting will not necessarily be suitable for different scenarios.

Secondly, the inventors have discovered that if the default configuration is updated, it will be difficult to notify the user promptly, because such an update can only be carried out together with an edge device (or IoT gateway) software update.

Thus, at the present time, the inventors have discovered that some dynamic configuration modes have already been developed; in data acquisition, the configuration is adjusted on the basis of data analysis provided by a network management module. However, there are also problems when this method is used:

In the method, the inventors have discovered that the sampling parameters are fixed, and only the sampling time can be adjusted.

A brief summary of embodiments of the present invention is given below, in order to provide a basic understanding of some embodiments of embodiments of the present invention. It should be understood that this summary is not an exhaustive summary of all embodiments of the present invention. It is not intended to determine key or important parts of embodiments of the present invention, nor is it intended to define the scope thereof. It is merely intended to set out certain concepts in simplified form, to serve as an introduction to the more detailed description discussed later.

In view of the above, the present disclosure proposes an intelligent method, apparatus and system for configuring parameter sampling of an edge device. The method according to an embodiment of the present disclosure can recommend a parameter sampling solution according to different edge devices or different usage scenarios, etc. of the same edge device, wherein the parameter sampling solution may for example include the parameters to be sampled and the sampling frequency of each parameter. This makes it possible to avoid sampling too much data or insufficient data, so as to avoid taking up an excessive amount of network resources while ensuring that the device characteristics are described accurately. In addition, technicians can be provided with preliminary guidance, to avoid a situation where such technicians do not know where to begin due to a lack of experience.

According to one embodiment of the present disclosure, a configuration apparatus for configuring parameter sampling of an edge device is provided, comprising: an information acquisition unit, configured to acquire information relating to a use and a usage environment of an edge device; a sending unit, configured to send the information to a cloud platform; and a configuration information determining unit, configured to receive, from the cloud platform, configuration information for performing parameter sampling of the edge device, wherein the configuration information is configuration information that is matched to the information and determined by the cloud platform using a configuration model stored therein.

According to another embodiment of the present disclosure, a cloud platform for configuring parameter sampling of a device comprises: an information receiving unit, configured to receive information relating to a use and a usage environment of an edge device; and a configuration model storage unit, configured to store a configuration model obtained by learning, the configuration model being used to determine configuration information for performing parameter sampling of the edge device, said configuration information being matched to the information received.

According to another embodiment of the present disclosure, a system for configuring parameter sampling of a device is provided, comprising: at least one edge device; the configuration apparatus of an embodiment; and the cloud platform of an embodiment, wherein the edge device is connected to the cloud platform via the configuration apparatus, and the configuration apparatus uses a configuration model stored on the cloud platform to determine configuration information for performing parameter sampling of the edge device.

According to another embodiment of the present disclosure, a method for configuring parameter sampling of an edge device is provided, comprising: acquiring information relating to a use and a usage environment of an edge device; sending the acquired information to a cloud platform; and receiving, from the cloud platform, configuration information for performing parameter sampling of the edge device, wherein the configuration information is configuration information that is matched to the information and determined by the cloud platform using a configuration model stored therein.

According to another embodiment of the present disclosure, a method for configuring parameter sampling of an edge device is provided, comprising: receiving information relating to a use and a usage environment of an edge device; using a stored configuration model obtained by learning to determine configuration information for performing parameter sampling of the edge device, said configuration information being matched to the information received.

According to another embodiment of the present disclosure, a computing device is provided, comprising: at least one processor; and a memory coupled to the at least one processor, the memory being configured to store an instruction; when the instruction is executed by the at least one processor, the processor is caused to perform the method of an embodiment.

According to another embodiment of the present disclosure, a non-transitory machine-readable storage medium is provided, storing an executable instruction which, when executed, causes the machine to perform the method of an embodiment.

According to another embodiment of the present disclosure, a computer program product is provided, being tangibly stored on a computer readable medium and comprising a computer executable instruction which, when executed, causes at least one processor to perform the method of an embodiment.

BRIEF DESCRIPTION OF THE DRAWINGS

The above and other objectives, characteristics and advantages of the present invention will be understood more easily with reference to the following explanation of embodiments of the present invention in conjunction with the drawings. The components in the drawings are merely intended to show the principles of the present invention. In the drawings, identical or similar technical features or components will be indicated with identical or similar reference labels.

REFERENCE LABELS

10: system for configuring parameter sampling of edge device
100: edge device
200: configuration apparatus
300: cloud platform
202: information acquisition unit
204: sending unit
206: configuration information determining unit
208: update unit
300: cloud platform
302: information receiving unit
304: configuration model storage unit
306: configuration model training unit
308: configuration model optimization unit
400, 500: method for configuring parameter sampling of edge device
S402, S404, S406, S408, S502, S504, S506, S508: steps
600: computing device
602: processor
604: memory
700: computing device
702: processor
704: memory

DETAILED DESCRIPTION OF THE EXAMPLE EMBODIMENTS

In view of the above, the present disclosure proposes an intelligent method, apparatus and system for configuring parameter sampling of an edge device. The method according to an embodiment of the present disclosure can recommend a parameter sampling solution according to different edge devices or different usage scenarios, etc. of the same edge device, wherein the parameter sampling solution may for example include the parameters to be sampled and the sampling frequency of each parameter. This makes it possible to avoid sampling too much data or insufficient data, so as to avoid taking up an excessive amount of network resources while ensuring that the device characteristics are described accurately. In addition, technicians can be provided with preliminary guidance, to avoid a situation where such technicians do not know where to begin due to a lack of experience.

According to one embodiment of the present disclosure, a configuration apparatus for configuring parameter sampling of an edge device is provided, comprising: an information acquisition unit, configured to acquire information relating to a use and a usage environment of an edge device; a sending unit, configured to send the information to a cloud platform; and a configuration information determining unit, configured to receive, from the cloud platform, configuration information for performing parameter sampling of the edge device, wherein the configuration information is configuration information that is matched to the information and determined by the cloud platform using a configuration model stored therein.

Optionally, in one example of the abovementioned embodiment, the information relating to the use and usage environment of the edge device comprises at least one of the following items of information: device type, surrounding environment, position, usage scenario and data collection target.

Optionally, in one example of the abovementioned embodiment, the configuration information comprises: a parameter to be sampled and a sampling frequency of each parameter.

In this way, the configuration model stored on the cloud platform can be used to automatically determine configuration information for performing parameter sampling of the edge device, and the user can even use the configuration information directly without adjustment; moreover, it is possible to avoid collecting too much data or insufficient data, so that the data transmission efficiency and the storage availability of cloud platform data can be maximized, so as to avoid taking up an excessive amount of network resources while ensuring that the device characteristics are described accurately.

Optionally, in one example of the abovementioned embodiment, the configuration apparatus further comprises an update unit, the update unit being configured to amend the configuration information received from the cloud platform, and send the amended configuration information to the cloud platform.

The update unit is further configured to: send to the cloud platform the amended configuration information together with the information that relates to the use and usage environment of the edge device and is matched to the configuration information, for the cloud platform to use as training data to further learn the configuration model.

In this way, it is possible to amend the configuration information recommended by the cloud platform according to customer requirements, and make corresponding amendments to the configuration model on the cloud platform.

According to another embodiment of the present disclosure, a cloud platform for configuring parameter sampling of a device comprises: an information receiving unit, configured to receive information relating to a use and a usage environment of an edge device; and a configuration model storage unit, configured to store a configuration model obtained by learning, the configuration model being used to determine configuration information for performing parameter sampling of the edge device, said configuration information being matched to the information received.

Optionally, in one example of the abovementioned embodiment, the information relating to the use and usage environment of the edge device comprises at least one of the following items of information: device type, surrounding environment, position, usage scenario and data collection target.

Optionally, in one example of the abovementioned embodiment, the configuration information comprises: a parameter to be sampled and a sampling frequency of each parameter.

In this way, the configuration model stored on the cloud platform can be used to automatically determine configuration information for performing parameter sampling of the edge device, and the user can even use the configuration information directly without adjustment; moreover, it is possible to avoid collecting too much data or insufficient data, so that the data transmission efficiency and the storage availability of cloud platform data can be maximized, so as to avoid taking up an excessive amount of network resources while ensuring that the device characteristics are described accurately.

Optionally, in one example of the abovementioned embodiment, the cloud platform further comprises: a configuration model learning unit, configured to collect sample data for learning in order to obtain the configuration model, the sample data comprising information relating to a use and a usage environment of an edge device and configuration information used for parameter sampling of the edge device.

Optionally, in one example of the abovementioned embodiment, the configuration model uses one of the following methods for learning: a weighted average method, a forgetting factor and a neural network.

In this way, collected historical sample data can be used to obtain a configuration model by learning, and based on acquired information relating to a use and a usage environment of an edge device, the configuration model can be used to automatically determine configuration information for performing parameter sampling of the edge device.

Optionally, in one example of the abovementioned embodiment, the cloud platform further comprises: a configuration model optimization unit, configured to update the configuration model on the basis of amended configuration information.

Optionally, in one example of the abovementioned embodiment, the configuration model optimization unit is further configured to: use as training data the amended configuration information and the information that relates to the use and usage environment of the edge device and is matched to the configuration information, in order to further learn the configuration model.

In this way, the configuration model can be updated according to the amendments made by the user to the configuration information, so as to obtain optimized configuration information.

According to another embodiment of the present disclosure, a system for configuring parameter sampling of a device is provided, comprising: at least one edge device; the configuration apparatus of an embodiment; and the cloud platform of an embodiment, wherein the edge device is connected to the cloud platform via the configuration apparatus, and the configuration apparatus uses a configuration model stored on the cloud platform to determine configuration information for performing parameter sampling of the edge device.

According to another embodiment of the present disclosure, a method for configuring parameter sampling of an edge device is provided, comprising: acquiring information relating to a use and a usage environment of an edge device; sending the acquired information to a cloud platform; and receiving, from the cloud platform, configuration information for performing parameter sampling of the edge device, wherein the configuration information is configuration information that is matched to the information and determined by the cloud platform using a configuration model stored therein.

Optionally, in one example of the abovementioned embodiment, the information relating to the use and usage environment of the edge device comprises at least one of the following items of information: device type, surrounding environment, position, usage scenario and data collection target.

Optionally, in one example of the abovementioned embodiment, the configuration information comprises: a parameter to be sampled and a sampling frequency of each parameter.

Optionally, in one example of the abovementioned embodiment, the method further comprises update processing: amending the configuration information received from the cloud platform, and sending the amended configuration information to the cloud platform.

Optionally, in one example of the abovementioned embodiment, the update processing further comprises: sending to the cloud platform the amended configuration information together with the information that relates to the use and usage environment of the edge device and is matched to the configuration information, for the cloud platform to use as training data to further learn the configuration model.

According to another embodiment of the present disclosure, a method for configuring parameter sampling of an edge device is provided, comprising: receiving information relating to a use and a usage environment of an edge device; using a stored configuration model obtained by learning to determine configuration information for performing parameter sampling of the edge device, said configuration information being matched to the information received.

Optionally, in one example of the abovementioned embodiment, before receiving the information relating to the use and usage environment of the edge device, the method further comprises: collecting sample data for learning in order to obtain the configuration model, the sample data comprising information relating to a use and a usage environment of an edge device and configuration information used for parameter sampling of the edge device.

Optionally, in one example of the abovementioned embodiment, the method further comprises: updating the configuration model on the basis of amended configuration information.

According to another embodiment of the present disclosure, a computing device is provided, comprising: at least one processor; and a memory coupled to the at least one processor, the memory being configured to store an instruction; when the instruction is executed by the at least one processor, the processor is caused to perform the method of an embodiment.

According to another embodiment of the present disclosure, a non-transitory machine-readable storage medium is provided, storing an executable instruction which, when executed, causes the machine to perform the method of an embodiment.

According to another embodiment of the present disclosure, a computer program product is provided, being tangibly stored on a computer readable medium and comprising a computer executable instruction which, when executed, causes at least one processor to perform the method of an embodiment.

The subject matter described herein will now be discussed with reference to example embodiments. It should be understood that the discussion of these embodiments is merely intended to enable those skilled in the art to better understand and thereby implement the subject matter described herein, without limiting the protection scope, applicability or examples expounded in the claims. The functions and arrangement of the elements discussed can be changed without deviating from the scope of protection of the content of the present disclosure. In each of the examples, various processes or components can be omitted, replaced or added as required. For example, the method described can be performed in a different order from that described, and each of the steps can be added, omitted or combined. Furthermore, features described in relation to some examples can also be combined in other examples.

As used herein, the term "comprises" and variants thereof indicate open terms, with the meaning "includes but is not limited to". The term "based on" means "at least partially based on". The terms "one embodiment" and "an embodiment" mean "at least one embodiment". The term "another embodiment" means "at least one other embodiment". The terms "first", "second", etc. can denote different or identical objects. Other definitions may be included below, either explicit or implicit. Unless clearly indicated in the context, the definition of a term is the same throughout the specification.

The present disclosure provides an intelligent method, apparatus and system for configuring parameter sampling of an edge device. The method according to an embodiment of the present disclosure can recommend a parameter sampling solution according to different edge devices or different usage scenarios, etc. of the same edge device, wherein the parameter sampling solution may for example include the parameters to be sampled and the sampling frequency of each parameter. This makes it possible to avoid sampling too much data or insufficient data, so as to avoid taking up an excessive amount of network resources while ensuring that the device characteristics are described accurately.

The system, apparatus and method for configuring parameter sampling of an edge device according to embodiments of the present disclosure are now described in conjunction with the drawings.

Figure 1:
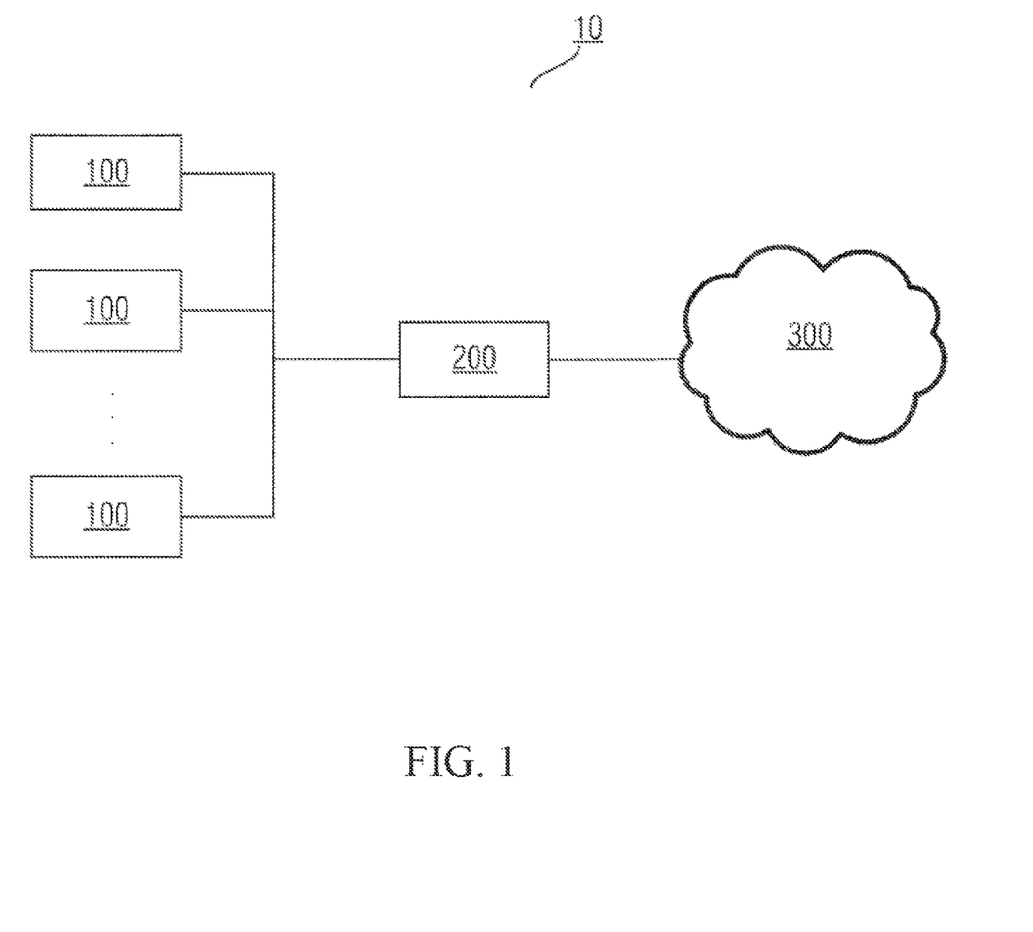
FIG. 1 shows a block diagram of a system for configuring parameter sampling of an edge device according to an embodiment of the present disclosure.

FIG. 1 shows a block diagram of a system 10 for configuring parameter sampling of an edge device according to an embodiment of the present disclosure. The system 10 comprises multiple edge devices 100, a configuration apparatus 200 and a cloud platform 300.

In order to understand the characteristics of one of the multiple edge devices, this edge device 100 can be subjected to data sampling. The edge device 100 may for example be different types of device such as a driver, machine tool, product line or factory; each edge device may comprise at least one sensor, for collecting data of a corresponding parameter. As stated above, for the same edge device, although high-frequency data can describe the characteristics thereof more accurately, this will generate a large amount of data, which will need to take up a large amount of network resources, such as bandwidth and data storage.

In the system 10 for configuring parameter sampling of an edge device according to an embodiment of the present disclosure, the configuration apparatus 200 can determine configuration information for performing parameter sampling of the edge device 100, and the edge device 100 can undergo data sampling according to the parameters and sampling frequency demanded by the configuration information, so that it is possible to avoid taking up an excessive amount of network resources while ensuring that the edge device characteristics can be described accurately.

Specifically, the configuration apparatus 200 can upload to the cloud platform 300 information acquired from the edge device 100 and relating to the use and usage environment of the edge device. A configuration model obtained by learning in advance is stored on the cloud platform 300; using the configuration model, it is possible to determine configuration information for performing parameter sampling of the edge device that is matched to the uploaded information relating to the use and usage environment of the edge device. The configuration apparatus 200 can then obtain from the cloud platform 300 recommended configuration information for configuring parameter sampling of the edge device.

The information relating to the use and usage environment of the edge device may for example be the device type, use, surrounding environment, position, usage scenario, data collection target, etc. Those skilled in the art will understand that there is no restriction to the abovementioned information; it is also possible to acquire other information related to the edge device, and obtain recommended configuration information based on this information.

In one example, the configuration model may for example comprise a configuration information library, comprising configuration information lists corresponding to different edge devices or different uses and different usage environments of one edge device respectively. That is to say, there might also be different configuration information lists for the same edge device.

After receiving the information relating to the use and usage environment of the edge device, the cloud platform 300 can find the matching configuration information list in the configuration information library according to the information. The configuration information list may comprise information regarding which parameters need to be collected by the device and the frequency at which these parameters are collected. The cloud platform 300 then sends the configuration information list to the configuration apparatus 200, and the configuration apparatus 200 can issue an information sampling request to the edge device 100 according to the sampling information and sampling frequency in the configuration information list, and can thereby obtain data of corresponding parameters of the edge device 100.

In one example, the configuration information obtained from the cloud platform 300 can also be amended by the user on the configuration apparatus 200 as required; after the user has amended the configuration information, the amended configuration information is sent to the cloud platform 300 together with the corresponding information relating to the use and usage environment of the device, in order to update the configuration model on the basis of the amended configuration information.

The configuration model learning process and updating process are explained in further detail below.

Figure 2:
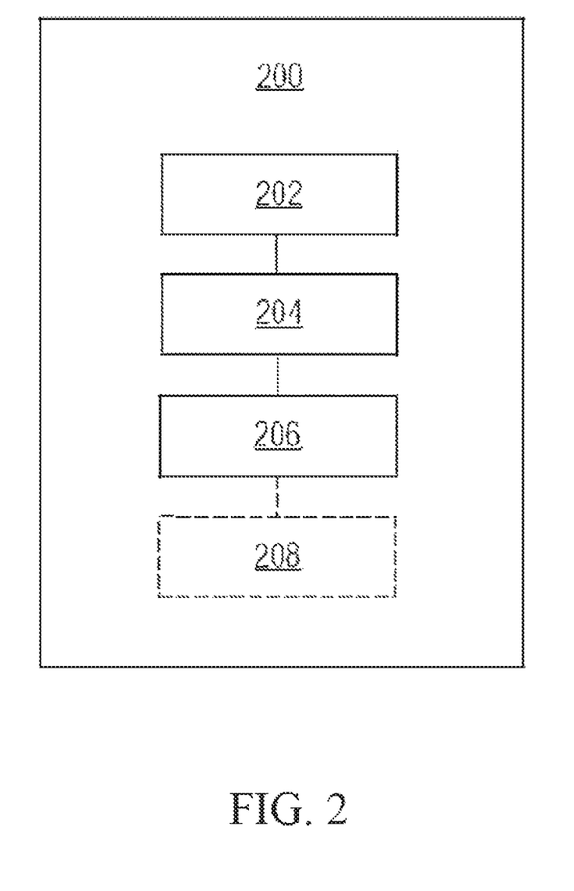
FIG. 2 is a block diagram showing an example configuration of a configuration apparatus for configuring parameter sampling of an edge device according to another embodiment of the present disclosure.

FIG. 2 is a block diagram showing an example configuration of the configuration apparatus 200 for configuring parameter sampling of an edge device according to an embodiment of the present disclosure.

As shown in FIG. 2, the configuration apparatus 200 for configuring parameter sampling of an edge device comprises: an information acquisition unit 202, a sending unit 204 and a configuration information determining unit 206.

The information acquisition unit 202 is configured to acquire information relating to the use and usage environment of the edge device 100.

The sending unit 204 is configured to send the information to the cloud platform 300.

The configuration information determining unit 206 is configured to receive from the cloud platform 300 configuration information for performing parameter sampling of the edge device 100, the configuration information being configuration information that is matched to the information and determined by the cloud platform 300 using the configuration model stored therein.

The information relating to the use and usage environment of the edge device comprises at least one of the following items of information: device type, surrounding environment, position, usage scenario and data collection target.

The configuration information comprises: the parameters to be sampled and the sampling frequency of each parameter.

Optionally, the configuration apparatus 200 may further comprise an update unit 208, the update unit 208 being configured to amend the configuration information received from the cloud platform 300, and send the amended configuration information to the cloud platform 300.

The update unit 208 may be further configured to: send to the cloud platform 300 the amended configuration information together with the information that relates to the use and usage environment of the edge device (acquired by the information acquisition unit 202) and is matched to the configuration information, for the cloud platform 300 to use as training data to further learn the configuration model.

Figure 3:
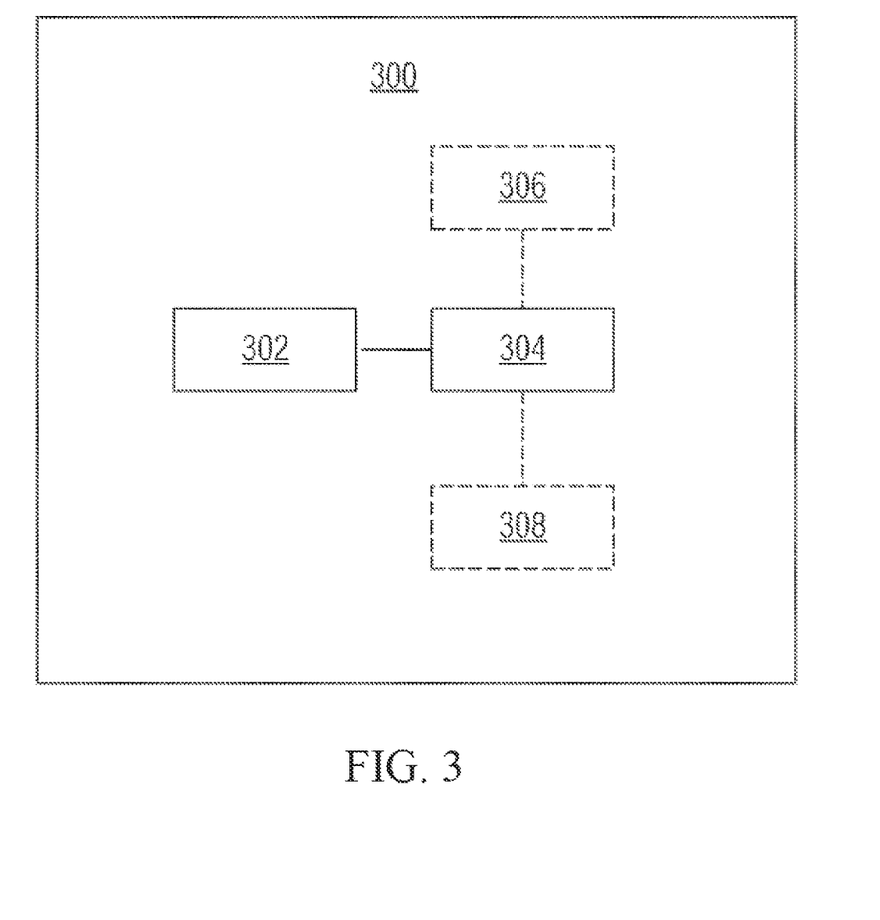
FIG. 3 is a block diagram showing an example configuration of a cloud platform for configuring parameter sampling of an edge device according to another embodiment of the present disclosure.

FIG. 3 is a block diagram showing an example configuration of the cloud platform 300 for configuring parameter sampling of an edge device according to an embodiment of the present disclosure.

As shown in FIG. 3, the cloud platform 300 for configuring parameter sampling of an edge device comprises an information receiving unit 302 and a configuration model storage unit 304.

The information receiving unit 302 is configured to receive the information relating to the use and usage environment of the edge device 100.

For example, the information receiving unit 302 can receive the information relating to the use and usage environment of the edge device 100 that is sent from the sending unit 204 of the configuration apparatus 200 shown in FIG. 2.

The configuration model storage unit 304 is configured to store a configuration model obtained by learning, the configuration model being used to determine configuration information matched to the information received.

The information relating to the use and usage environment of the edge device comprises at least one of the following items of information: device type, surrounding environment, position, usage scenario and data collection target.

The configuration information comprises: the parameters to be sampled and the sampling frequency of each parameter.

In one example, the cloud platform 300 may further comprise a configuration model training unit 306, the configuration model training unit 306 being configured to collect sample data for learning in order to obtain the configuration model; the sample data may for example comprise information relating to the use and usage environment of edge devices that is collected from a large number of edge devices, and corresponding configuration information used for parameter sampling of the edge devices. For example, a method such as a weighted average method, a forgetting factor or a neural network can be used for learning.

Those skilled in the art will understand the specific process of learning by a method such as a weighted average method, a forgetting factor or a neural network to obtain the configuration model using the collected sample data, so this process is not described superfluously here.

In one example, the cloud platform 300 may further comprise a configuration model optimization unit 308, for updating the configuration model on the basis of the amended configuration information.

In one example, the amended configuration information received from the configuration apparatus 200 shown in FIG. 2, and the information that relates to the use and usage environment of the edge device and is matched to the pre-amendment configuration information, may for example be used as training data to further learn the configuration model.

An example process of updating the sampling parameters and sampling frequency in the configuration model is explained below, taking a weighted average method as an example.

Different weights are allocated to all of the sampling parameters and sampling times respectively. If, in the configuration information that is amended according to the user's needs, one parameter is deleted from the original configuration information, then the non-selection weight for the deleted parameter will increase, and the selection weights of the other parameters will also increase. Each time amended configuration information is received, the parameter weights are adjusted. If the non-selection weight of one parameter becomes larger than the selection weight, that parameter will be deleted from the configuration information.

If, in the amended configuration information, the sampling time of one parameter is changed, then an optimized sampling time can be calculated according to formula (1) below.

$$t_{new} = \frac{t_1 w_1 + t_2 w_2}{w_1 + w_2} \quad (1)$$

Where $t_{new}$ is the optimized sampling time, $t_1$ and $w_1$ are the sampling time and weight in the original configuration information, and $t_2$ and $w_2$ are the sampling time and weight in the amended configuration information. Thus, $t_{new}$ is the new sampling time in the configuration information. Amended configuration information can be generated in the manner described above.

Those skilled in the art will understand the specific process by which a neural network can be used to obtain the updated configuration model using the amended parameters and sampling time configuration information as training data, so this process is not described superfluously here.

Those skilled in the art will also understand the specific process of using an algorithm with a forgetting factor to update the configuration model, so this process is not described superfluously here.

It must be explained here that the structures of the system 10 for configuring parameter sampling of an edge device, the configuration apparatus 200 and the cloud platform 300 shown in FIGS. 1-3 and the component units thereof are merely example, and those skilled in the art could amend the structural block diagrams shown in FIGS. 1-3 as required.

Figure 4:
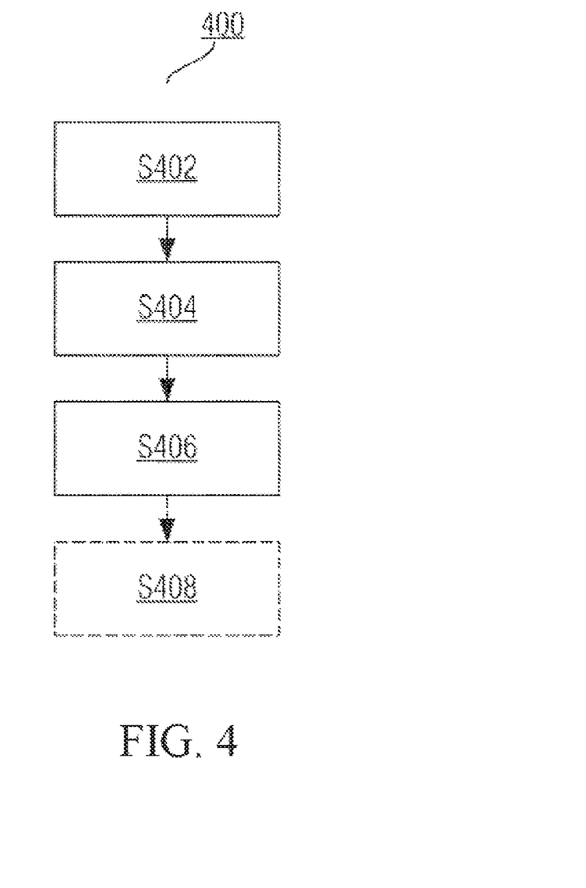
FIG. 4 is a flow chart showing an example process of a method for configuring parameter sampling of an edge device according to another embodiment of the present disclosure.

FIG. 4 is a flow chart showing an example process of a method 400 for configuring parameter sampling of an edge device according to an embodiment of the present disclosure.

First of all, in box S402, information relating to the use and usage environment of an edge device is acquired.

The processing in box S402 can be performed for example by way of the information acquisition unit 202 in the configuration apparatus 200 described with reference to FIG. 2.

The information relating to the use and usage environment of the edge device may for example be: device type, use, surrounding environment, position, usage scenario, data collection target, etc.

Next, in box S404, the acquired information is sent to a cloud platform.

The processing in box S404 can be performed for example by way of the sending unit 204 in the configuration apparatus 200 described with reference to FIG. 2, and the cloud platform here may for example be the cloud platform 300 shown in FIG. 3.

Finally, in box S406, configuration information for performing parameter sampling of the edge device is received from the cloud platform, wherein the configuration information is configuration information that is matched to the information and determined by the cloud platform using a configuration model stored therein.

The processing in box S406 can be performed for example by way of the configuration information determining unit 206 in the configuration apparatus 200 described with reference to FIG. 2.

Specifically, the configuration information may for example comprise the parameters to be collected and the collection frequency of each parameter.

Optionally, the method 400 may further comprise update processing in box S408: amending the configuration information received from the cloud platform, and sending the amended configuration information to the cloud platform.

The update processing in box S408 may further comprise: sending to the cloud platform the amended configuration information together with the information that relates to the use and usage environment of the edge device and is matched to the original configuration information, for the cloud platform to use as training data to further learn the configuration model.

The update processing in box S408 can be performed for example by way of the update unit 208 in the configuration apparatus 200 described with reference to FIG. 2.

Figure 5:
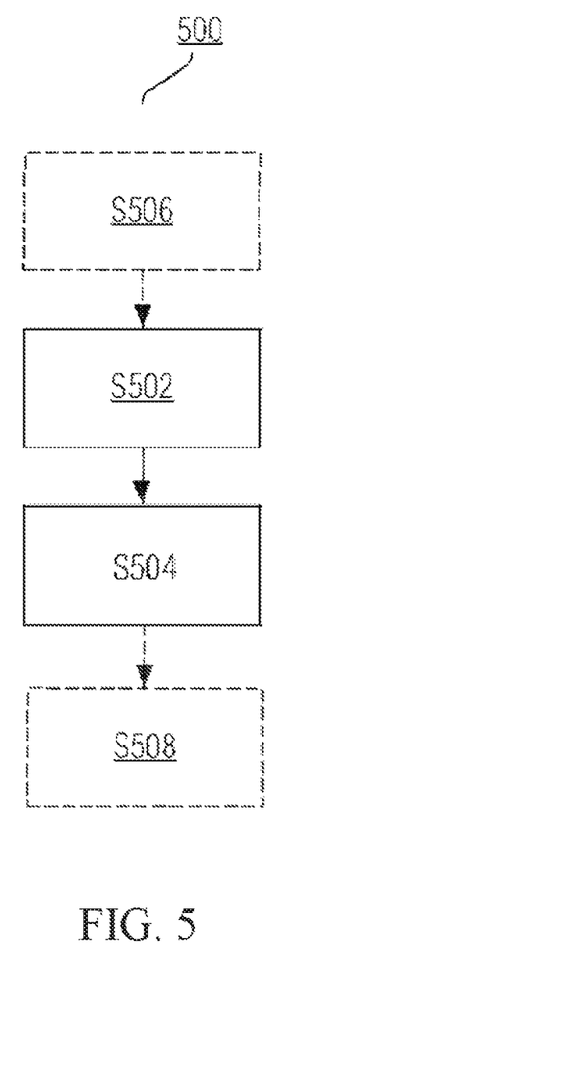
FIG. 5 is a flow chart showing an example process of a method for configuring parameter sampling of an edge device according to another embodiment of the present disclosure.

FIG. 5 is a flow chart showing an example process of a method 500 for configuring parameter sampling of an edge device according to an embodiment of the present disclosure.

First of all, in box S502, information relating to the use and usage environment of an edge device is received.

The information relating to the use and usage environment of the edge device that is sent from the sending unit 204 in the configuration apparatus 200 described with reference to FIG. 2 may for example be received by way of the information receiving unit 302 in the cloud platform 300 described with reference to FIG. 3.

The information relating to the use and usage environment of the edge device may for example be: device type, use, surrounding environment, position, usage scenario, data collection target, etc.

Next, in box S504, a stored configuration model obtained by learning is used to determine configuration information matched to the received information.

The processing in box S504 can for example be performed by way of the configuration model storage unit 304 in the cloud platform 300 described with reference to FIG. 3.

Specifically, the configuration information may for example comprise the parameters to be collected and the collection frequency of each parameter.

In one example, before the processing in box S502 is performed, the method 500 may further comprise a configuration model learning process in box S506: collecting sample data for learning in order to obtain the configuration model, the sample data comprising information relating to the use and usage environment of an edge device and configuration information used for parameter sampling of the edge device.

The processing in box S506 can for example be performed by way of the configuration model training unit 306 in the cloud platform 300 described with reference to FIG. 3.

In one example, the method 500 may further comprise configuration model optimization processing in box S508: based on amended configuration information, updating the configuration model.

The processing in S508 can for example be performed by way of the configuration model optimization unit 308 in the cloud platform 300 described with reference to FIG. 3.

The details of the operations in the various parts of methods 400 and 500 may for example be identical or similar to the relevant parts of the embodiments of the system 10 for configuring parameter sampling of an edge device, the configuration apparatus 200 and the cloud platform 300 according to the present disclosure which are described with reference to FIGS. 1-3, so are not described in detail again here.

The system, apparatus and method for configuring parameter sampling of an edge device according to embodiments of the present disclosure have been described above with reference to FIGS. 1-5. The apparatus for configuring parameter sampling of an edge device and the cloud platform above can be realized using hardware, or realized using software or a combination of hardware and software.

Figure 6:
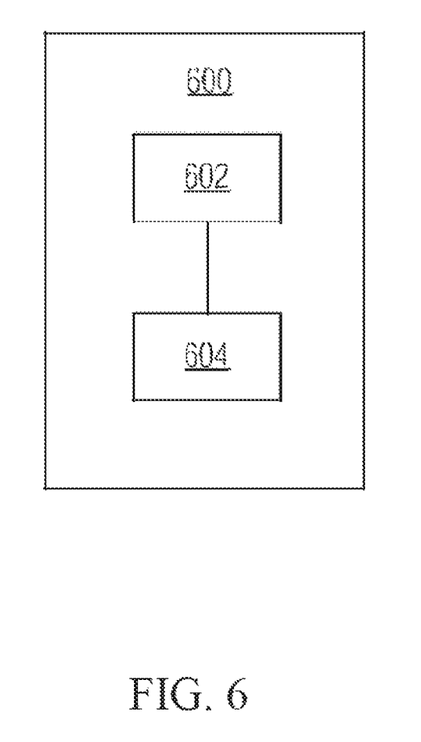
FIG. 6 shows a block diagram of a computing device for configuring parameter sampling of an edge device according to an embodiment of the present disclosure.

In the present disclosure, the configuration apparatus 200 for configuring parameter sampling of an edge device may be realized using a computing device. FIG. 6 shows a block diagram of a computing device 600 for configuring parameter sampling of an edge device according to an embodiment of the present disclosure. According to one embodiment, the computing device 600 may comprise at least one processor 602, wherein the processor 602 executes at least one computer readable instruction (i.e. the abovementioned element realized in the form of software) stored or encoded in a computer readable storage medium (i.e. a memory 604).

In one embodiment, a computer executable instruction is stored in the memory 604, and when executed, the computer executable instruction causes the at least one processor 602 to perform the following actions: acquiring information relating to the use and usage environment of an edge device; sending the acquired information to a cloud platform; and receiving from the cloud platform configuration information for performing parameter sampling of the edge device, wherein the configuration information is configuration information that is matched to the information and determined by the cloud platform using a configuration model stored therein.

It should be understood that when executed, the computer executable instruction stored in the memory 604 causes the at least one processor 602 to perform the various operations and functions described above in conjunction with FIGS. 1-2 in various embodiments of the present disclosure.

Figure 7:
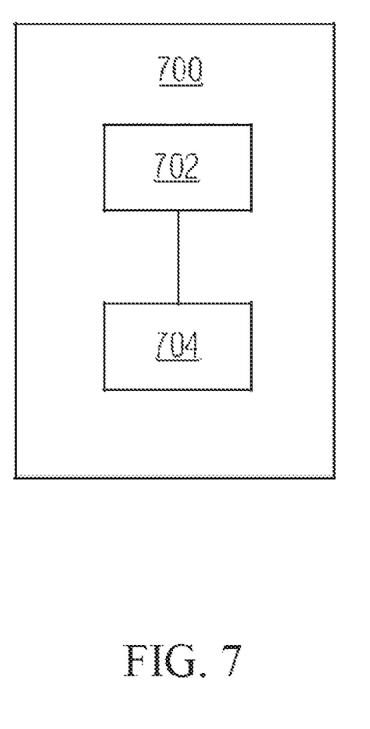
FIG. 7 shows a block diagram of a computing device for configuring parameter sampling of an edge device according to an embodiment of the present disclosure.

In the present disclosure, the cloud platform 300 for configuring parameter sampling of an edge device may be realized using a computing device. FIG. 7 shows a block diagram of a computing device 700 for configuring parameter sampling of an edge device according to an embodiment of the present disclosure. According to one embodiment, the computing device 700 may comprise at least one processor 702, wherein the processor 702 executes at least one computer readable instruction (i.e. the abovementioned element realized in the form of software) stored or encoded in a computer readable storage medium (i.e. a memory 704).

In one embodiment, a computer executable instruction is stored in the memory 704, and when executed, the computer executable instruction causes the at least one processor 702 to perform the following actions: receiving information relating to the use and usage environment of an edge device; using a stored configuration model obtained by learning to determine configuration information matched to the received information.

It should be understood that when executed, the computer executable instruction stored in the memory 704 causes the at least one processor 702 to perform the various operations and functions described above in conjunction with FIG. 3 in various embodiments of the present disclosure.

According to one embodiment, a non-transitory machine-readable medium is provided. The non-transitory machine-readable medium may have a machine executable instruction (i.e. the abovementioned element realized in the form of software) which, when executed by a machine, causes the machine to perform the various operations and functions described above in conjunction with FIGS. 1-5 in various embodiments of the present disclosure.

According to one embodiment, a computer program product is provided, comprising a computer executable instruction which, when executed, causes at least one processor to perform the various operations and functions described above in conjunction with FIGS. 1-5 in various embodiments of the present disclosure.

The particular modes of implementation expounded above in conjunction with the drawings have described example embodiments, but do not represent all embodiments which can be realized or which fall within the scope of protection of the claims. The term "example" used throughout this specification means "used as an example, real example or exemplification", but does not mean "preferred" or "advantageous" compared to other embodiments. Particular embodiments include specific details, with the aim of providing an understanding of the techniques described. However, these techniques can be implemented in the absence of these specific details. In some real examples, commonly known structures and apparatuses are shown in the form of block diagrams, in order to avoid making the concepts of the described embodiments difficult to understand.

The above description of the content of the present disclosure has been provided to enable any person of ordinary skill in the art to implement or use the content of the present disclosure. To those skilled in the art, various amendments to the content of the present disclosure will be obvious, and the general principles defined herein can also be applied to other variants without departing from the scope of protection of the content of the present disclosure. Thus, the content of the present disclosure is not limited to the examples and designs described herein, but is consistent with the broadest scope that conforms to the principles and novel features disclosed herein.

The invention claimed is:

1. A configuration apparatus for configuring parameter sampling of an edge device, the configuration apparatus comprising:
   at least one processor; and
   a memory, coupled to the at least one processor, the memory being configured to store instructions that when executed by the at least one processor cause the configuration apparatus to
      acquire information relating to a use and a usage environment of an edge device,
      send the information to a cloud platform,
      receive, from the cloud platform, configuration information for performing parameter sampling of the edge device, wherein the configuration information is matched to the information relating to a use and a usage environment of an edge device, amend the configuration information received from the cloud platform based on user input to create amended configuration information, and send the amended configuration information to the cloud platform, wherein a configuration model determines the configuration information and is obtained by learning with collected sample data at the cloud platform, the collected sample data including use and usage environment information of one or more edge devices and corresponding configuration information used for performing parameter sampling of the one or more edge devices.

2. The configuration apparatus of claim 1, wherein the information relating to the use and the usage environment of the edge device includes at least one of:
device type,
surrounding environment,
position,
usage scenario, and
data collection target.

3. The configuration apparatus of claim 1, wherein the configuration information comprises:
a parameter to be sampled; and
a sampling frequency of each parameter.

4. The configuration apparatus of claim 1, wherein the instructions that when executed by the processor further cause the at least one processor to:
send, to the cloud platform, the amended configuration information together with the information relating to the use and the usage environment of the edge device and matched to the configuration information, for the cloud platform to use as training data to further learn the configuration model.

5. A cloud platform for configuring parameter sampling of a device, the cloud platform comprising:
at least one processor; and
a memory, coupled to the at least one processor, the memory being configured to store instructions that when executed by the at least one processor cause the at least one processor to
receive information relating to a use and a usage environment of an edge device,
store a configuration model obtained by learning, the configuration model being used to determine configuration information for performing parameter sampling of the edge device, the configuration information being matched to the information received,
collect sample data for learning to obtain the configuration model, the sample data including use and usage environment information of one or more edge devices and corresponding configuration information used for performing parameter sampling of the one or more edge devices,
receive amended configuration information based on user input, and
update the configuration model based upon the amended configuration information.

6. The cloud platform of claim 5, wherein the information relating to the use and the usage environment of the edge device includes at least one of:
device type,
surrounding environment,
position, usage scenario, and
data collection target.

7. The cloud platform of claim 5, wherein the configuration information includes a parameter to be sampled and a sampling frequency of each parameter.

8. The cloud platform of claim 5, wherein the configuration model uses, for learning, one of:
a weighted average method,
a forgetting factor, and
a neural network.

9. The cloud platform of claim 5, wherein the instructions that when executed by the processor further cause the at least one processor to:
use as training data, the amended configuration information and the information relating to the use and the usage environment of the edge device and matched to the configuration information, to further learn the configuration model.

10. A system for configuring parameter sampling of a device, comprising:
the cloud platform of claim 5;
at least one edge device; and
a configuration apparatus for configuring parameter sampling of an edge device, comprising:
an information acquisition unit, configured to acquire information relating to a use and a usage environment of an edge device;
a sending unit, configured to send the information to the cloud platform; and
a configuration information determining unit, configured to receive, from the cloud platform, configuration information for performing parameter sampling of the edge device, wherein the configuration information is matched to the information and determined by the cloud platform using a configuration model stored in the cloud platform; and
wherein the edge device is connected to the cloud platform via the configuration apparatus, and the configuration apparatus is configured to use a configuration model stored on the cloud platform to determine configuration information for performing parameter sampling of the edge device.

11. A method for configuring parameter sampling of an edge device, the method comprising:
acquiring information relating to a use and a usage environment of an edge device;
sending the information acquired to a cloud platform;
receiving, from the cloud platform, configuration information for performing parameter sampling of the edge device, the configuration information being relating to a use and a usage environment of an edge device;
amending the configuration information received from the cloud platform based on user input to create amended configuration information; and
sending the amended configuration information to the cloud platform,
wherein a configuration model is used to automatically determine the configuration information and is obtained by learning with collected sample data at the cloud platform, the collected sample data including use and usage environment information of one or more edge devices and corresponding configuration information used for performing parameter sampling of the one or more edge devices.

12. The method of claim 11, wherein the information relating to the use and the usage environment of the edge device includes at least one of:
device type, surrounding environment, position, usage scenario, and data collection target.

13. The method of claim 11, wherein the configuration information includes:

a parameter to be sampled, and a sampling frequency of each parameter.

14. The method of claim 11, further comprising:

sending to the cloud platform the amended configuration information, together with the information relating to the use and the usage environment of the edge device and matched to the configuration information, for the cloud platform to use as training data to further learn the configuration model.

15. A method for configuring parameter sampling of an edge device with a cloud platform, the method comprising:

receiving information relating to a use and a usage environment of an edge device;

using a stored configuration model obtained by learning to determine configuration information for performing parameter sampling of the edge device, the configuration information being matched to the information received;

before receiving the information relating to the use and the usage environment of the edge device, collecting sample data for learning to obtain the stored configuration model, the collected sample data including use and usage environment information of one or more edge devices and corresponding configuration information used for performing parameter sampling of the one or more edge devices;

receiving amended configuration information based on user input; and updating the stored configuration model based on the amended configuration information.

16. The method of claim 15, further comprising:

updating the stored configuration model based upon amended configuration information.

17. A computing device, comprising:

at least one processor; and a memory, coupled to the at least one processor, the memory being configured to store an instruction, and upon the instruction being executed by the at least one processor, the at least one processor is caused to perform the method of claim 11.

18. A non-transitory machine-readable storage medium, storing an executable instruction which, when executed by a machine, causes the machine to perform the method of claim 11.

19. A computer program product, being tangibly stored on a computer readable medium and including a computer executable instruction which, when executed by at least one processor, causes at least one processor to perform the method of claim 11.

20. A computing device, comprising:

at least one processor; and a memory, coupled to the at least one processor, the memory being configured to store an instruction, and when the instruction is executed by the at least one processor, the at least one processor is caused to perform the method of claim 15.

21. A non-transitory machine-readable storage medium, storing an executable instruction which, when executed by a machine, causes the machine to perform the method of claim 15.

22. A computer program product, being tangibly stored on a computer readable medium and including a computer executable instruction which, when executed by at least one processor, causes at least one processor to perform the method of claim 15.

* * * * *